(12) United States Patent
Hilburger et al.

(10) Patent No.: US 6,619,635 B1
(45) Date of Patent: Sep. 16, 2003

(54) AIR SPRING CLAMPING ASSEMBLY

(75) Inventors: Mark D. Hilburger, Carmel, IN (US); Daniel J. Leonard, Carmel, IN (US)

(73) Assignee: BFS Diversified Products, LLC, Carmel, IN (US)

( * ) Notice: Subject to any disclaimer, the term of this patent is extended or adjusted under 35 U.S.C. 154(b) by 0 days.

(21) Appl. No.: 10/118,645

(22) Filed: Apr. 8, 2002

(51) Int. Cl.$^7$ .................................................. F16F 9/04
(52) U.S. Cl. .................................. 267/64.23; 267/64.27
(58) Field of Search ........................... 267/64.27, 64.24, 267/64.23, 64.21, 64.19, 122, 118, 153, 64.28

(56) References Cited

U.S. PATENT DOCUMENTS

| | | |
|---|---|---|
| 3,788,628 A | 1/1974 | Hotz, Jr. et al. |
| 4,378,935 A | 4/1983 | Brown et al. |
| 4,489,474 A | 12/1984 | Brown et al. |
| 4,657,229 A | 4/1987 | Thurow |
| 4,784,376 A | 11/1988 | Ecktman |
| 4,787,606 A | 11/1988 | Geno et al. |
| 4,787,607 A | 11/1988 | Geno et al. |
| 4,852,861 A | 8/1989 | Harris |
| 4,899,995 A | 2/1990 | Hoffman et al. |
| 4,946,144 A | 8/1990 | Geno et al. |
| 5,005,808 A | 4/1991 | Warmuth, II et al. |
| 5,267,725 A | 12/1993 | Wode et al. |
| 5,374,037 A | 12/1994 | Bledsoe |
| 5,460,354 A | 10/1995 | Easter |
| 5,669,597 A | 9/1997 | Rittstieg et al. |
| 5,931,451 A | 8/1999 | Onami |
| 5,941,509 A | 8/1999 | Avesian et al. |
| 6,036,180 A | 3/2000 | Ecktman |
| 6,474,630 B1 | 11/2002 | Weitzenhof |

*Primary Examiner*—Christopher P. Schwartz
*Assistant Examiner*—Melanie Torres
(74) *Attorney, Agent, or Firm*—Michael R. Huber; Michael Sand

(57) ABSTRACT

An air spring has a pair of axially spaced end members and an intervening elastomeric flexible sleeve extending therebetween and forming a fluid pressure chamber. An annular clamp ring has at least one radially extending rib formed on an inner sealingly surface which radially align with at least one concave recess formed on a sealing surface of one of the end members. The end member also has at least one radially extending rib which aligns with at least one recess formed in the clamp ring sealing surface. The rib and recess formed on the clamp ring are longer and deeper than the ribs and recesses on the sealing surface of the end member to provide a more aggressive clamping action on the outer surface of the flexible sleeve than the clamping action on the inner surface or innerliner of the sleeve.

17 Claims, 6 Drawing Sheets

AIR SPRING CLAMPING ASSEMBLY

BACKGROUND OF THE INVENTION

1. Technical Field

The invention relates to air springs, and more particularly to the clamping assembly which sealingly affixes a resilient elastomeric sleeve to an end member of the air spring. Even more particularly, the invention relates to a combination swage ring and end member sealing surface in which the swage ring has the more aggressive clamping ribs and grooves than does the end member to reduce the risk of causing leaks on the innerliner of the air spring sleeve.

2. Background Information

Pneumatic springs commonly referred to as air springs, have been used for a variety of uses including motor vehicles for a number of years to provide cushioning between movable parts of the vehicle or other types of equipment, primarily to absorb shock loads impressed on the vehicle axles by the wheels striking an object in the road or falling into a depression. The air spring usually consists of a flexible elastomeric sleeve or bellows containing a supply of compressed fluid and has one or more pistons attached to the flexible sleeve. The piston causes compression and expansion of the fluid within the sleeve as the sleeve compresses and expands as the vehicle experiences the road shock. The spring sleeve is formed of a flexible elastomeric material which permits the piston to move axially with respect to another piston or end member secured within opposite ends of the sleeve.

The ends of the sleeves are sealingly connected to the piston and/or opposite end member and is always one of the important and major aspects in producing an efficient and maintenance free air spring.

Many of these sealing connections are provided by a swage or clamp ring and an end member both of which have a plurality of mating ribs and grooves which provide pinch areas therebetween to securely clamp the elastomeric material and internal reinforcing cord of the sleeve therebetween. Heretofore in these clamping connections, the more aggressive clamping ribs and adjacent grooves engage the innerliner of the air spring sleeve with the less aggressive clamping ribs and grooves engaging the outer cover of the air spring sleeve. Although these types of clamp or swage ring connections have proven satisfactory, problems can occur in that the innerliner of the air spring sleeve can be pinched or cut by the relatively aggressive configuration of the clamping member, whether it be the swage ring and/or end member which can result in loss of air and pressure within the air spring.

BRIEF SUMMARY OF THE INVENTION

The present invention provides an air spring having a flexible sleeve with at least one open end wherein the clamping assembly has the more aggressive clamping projections and grooves which results in the higher stress concentration engaging the outer cover of the air spring sleeve with a less aggressive clamping pattern engaging the innerliner to reduce the risk of damaging the innerliner of the sleeve, which is the main fluid impervious layer which retains the energy absorbing fluid within the air spring.

Another feature of the invention is providing the clamping surface of the swage ring with one or more radially extending ribs which have a greater radial length and tighter radius of curvature than the aligned concave grooves formed on the sealing surface of the air spring end member.

A further feature of the invention is to provide the more aggressive radially extending swage ring ribs with a length approximately twice the depth of the aligned recesses on the end member and providing adjacent grooves in the swage ring with a depth of approximately twice the radial length of the aligned less aggressive ribs formed on the sealing surface of the end member.

Another aspect of the invention is to provide a radially extending shoulder on the end member which limits the axial movement of the swage ring during operation of the air spring.

Another advantage of the invention is to provide both the clamping surface of the swage ring and the clamping surface of the end member with a plurality of projections and adjacent recesses, the number of which can be varied to provide the desired clamping force depending upon the internal pressure contained within the air spring sleeve.

The foregoing advantages, construction, and operation of the present invention will become readily apparent from the following description and accompanying drawings.

BRIEF DESCRIPTION OF THE DRAWINGS

Similar numerals refer to similar parts throughout the drawings.

DETAILED DESCRIPTION OF THE INVENTION

Figure 1:
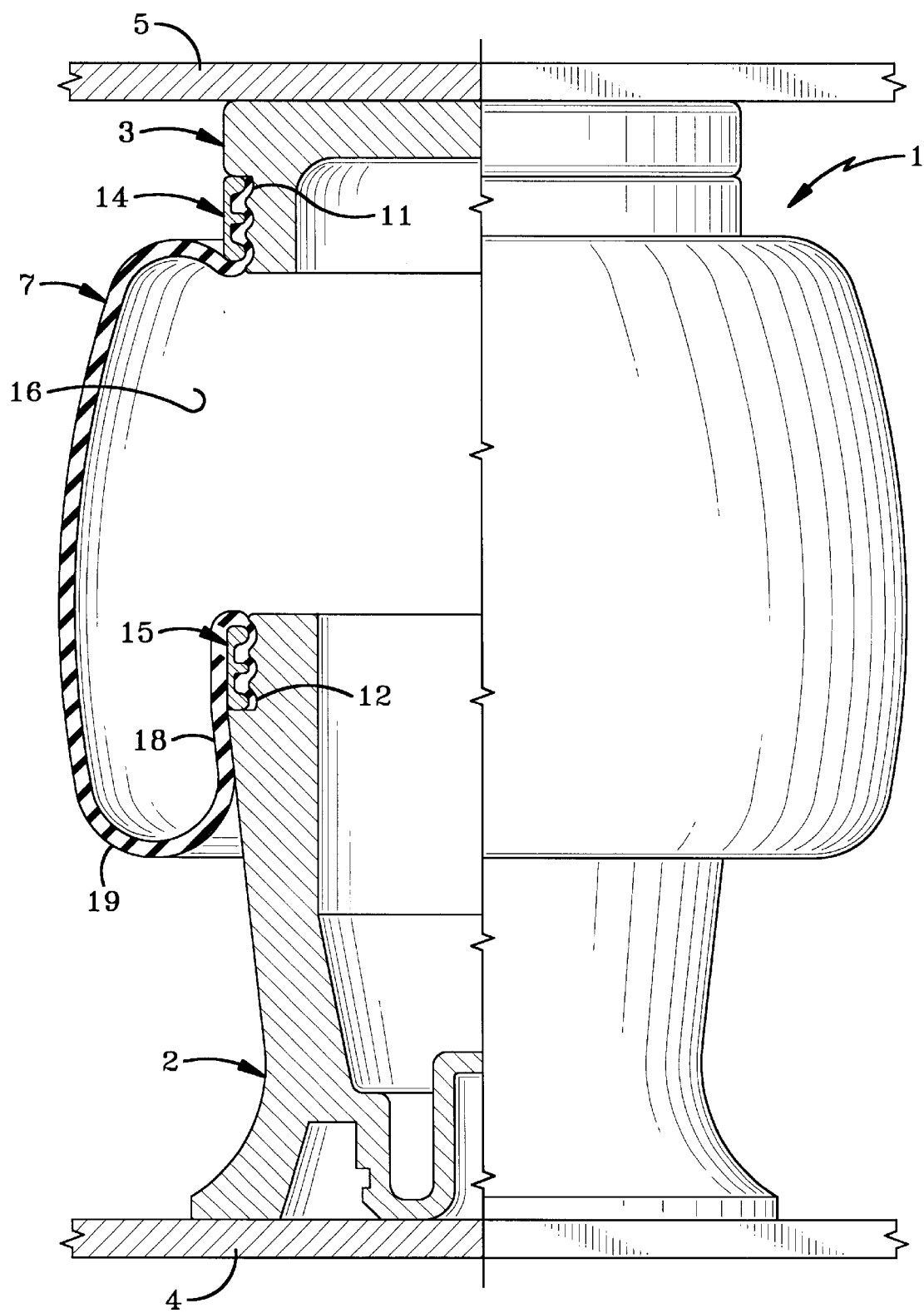
FIG. 1 is a side elevational view of the improved clamping assembly incorporated into an air spring with portions broken away and in section.
Figure 2:
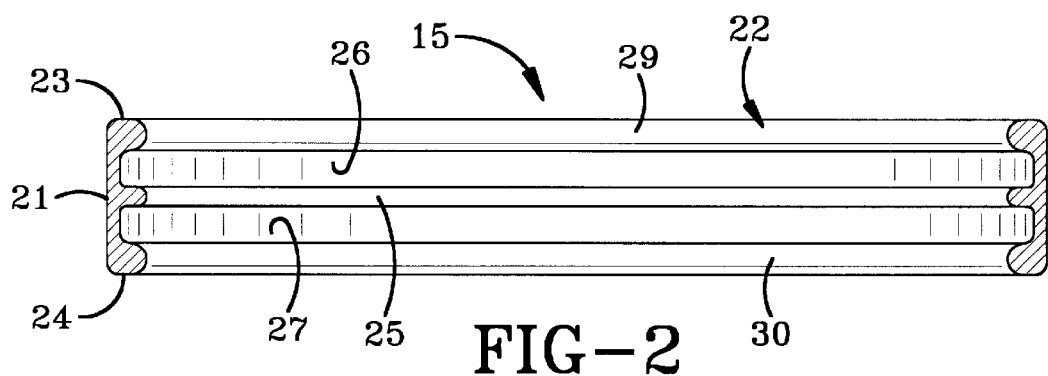
FIG. 2 is an enlarged sectional view of the swage ring.
Figure 3:
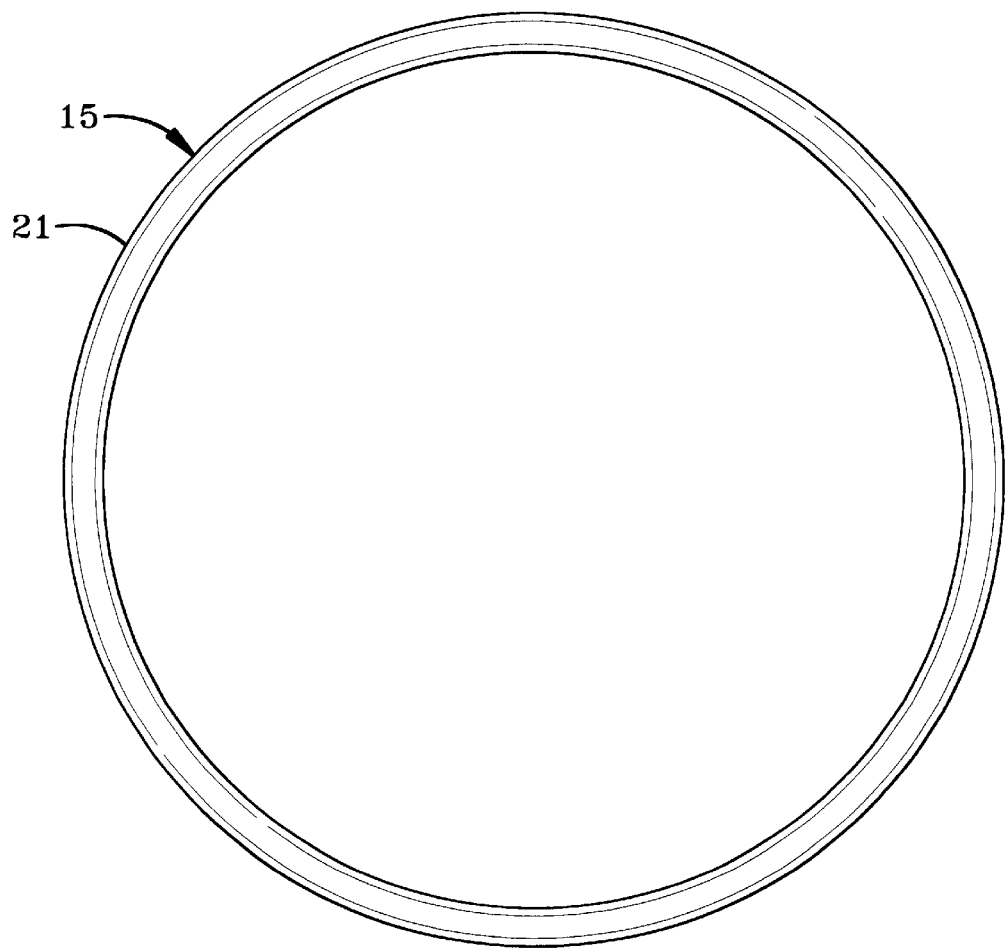
FIG. 3 is a top plan view of FIG. 2.

The improved clamping assembly of the present invention is shown utilized on an air spring indicated generally at 1, which is shown in an at-rest position in FIG. 1. Air spring 1 includes a usual piston member 2 and an end cap 3 which are adapted to be connected to spaced members 4 and 5 respectively, such as the frame and portions of a vehicle suspension system. End members 2 and 3 can have various configurations without affecting the concept of the invention.

A flexible sleeve 7, formed of an elastomeric material 8 and containing reinforcing cords 9 (FIG. 4), is formed with a pair of open ends 11 and 12 which are sealingly clamped by swage rings 14 and 15, respectively of the improved clamping assembly of the present invention, to form an internal fluid tight chamber 16. Sleeve 7 can be constructed in various manners, one common construction includes four separate layers (not shown) consisting of an outer surface layer, an innerliner layer, and two intervening calendered plies containing the reinforcing cords 9. Likewise, sleeve 7 can be formed with only one open end. The innerliner, indicated at 18, is formed of an elastomeric composition which is air impervious to prevent the escape of the internal fluid from the air spring. The outer ply which provides outer surface 19 may be of a material which provides for the greatest abrasion resistance than the other layers which form sleeve 7.

Figure 4:
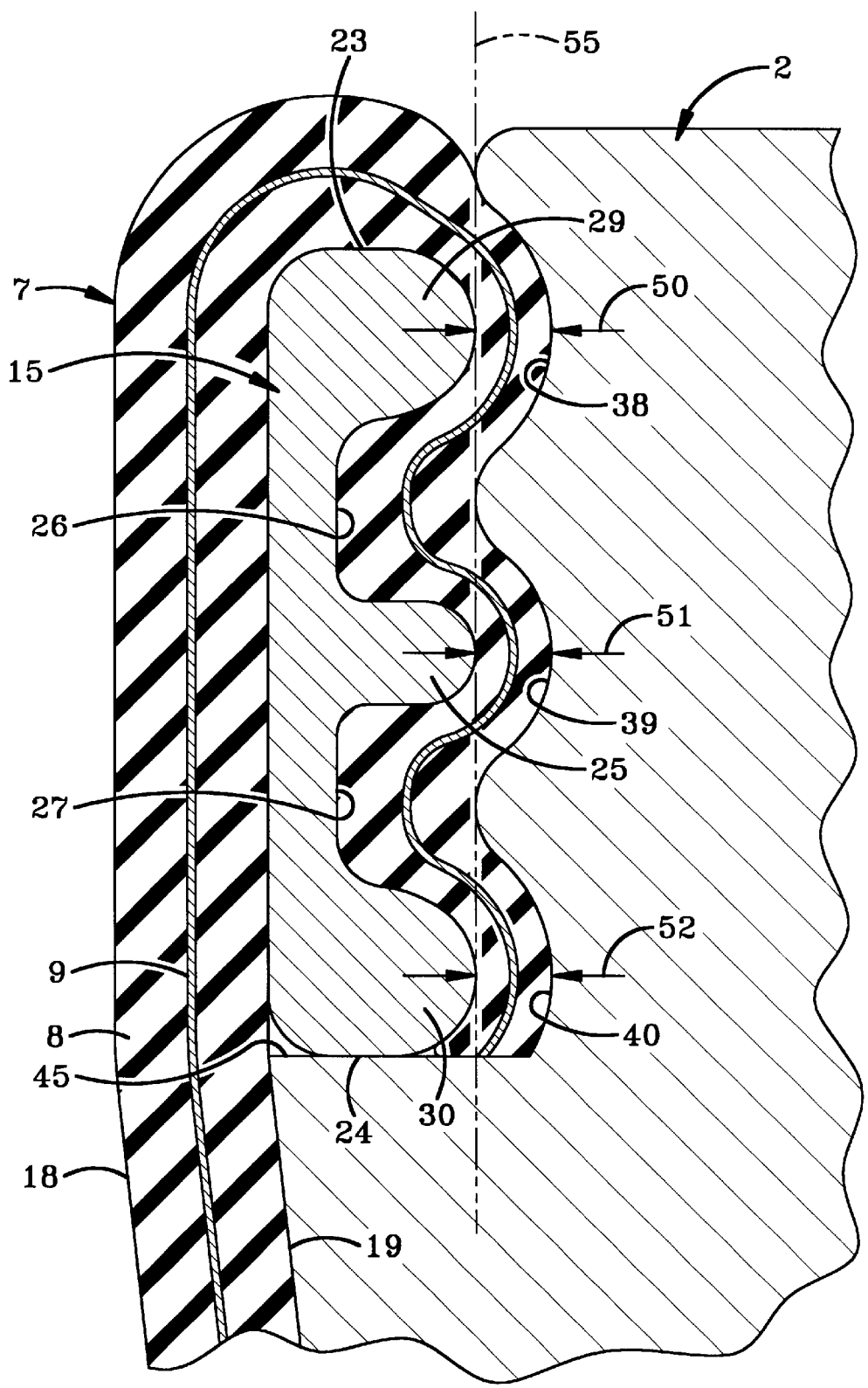
FIG. 4 is an enlarged fragmentary sectional view showing the swage ring securing one end of the elastomeric sleeve against the sealing surface of the piston.
Figure 6:
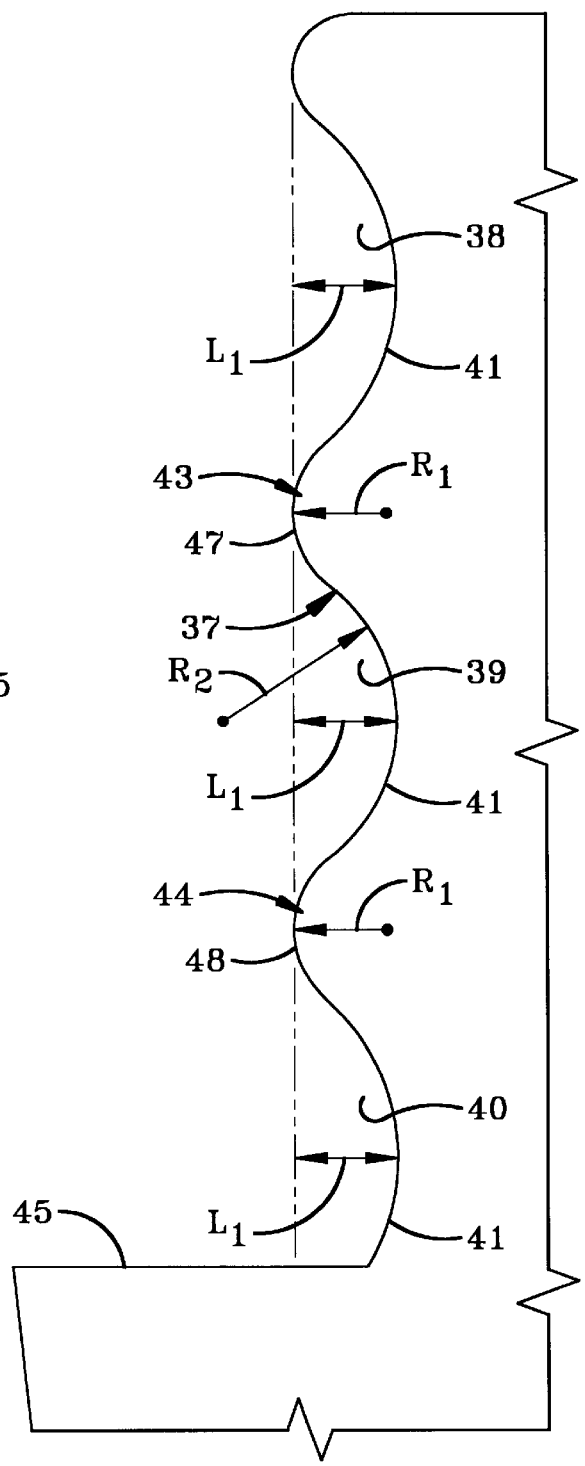
FIG. 6 is an enlarged fragmentary sectional view of the sealing surface of the piston.
Figure 7:
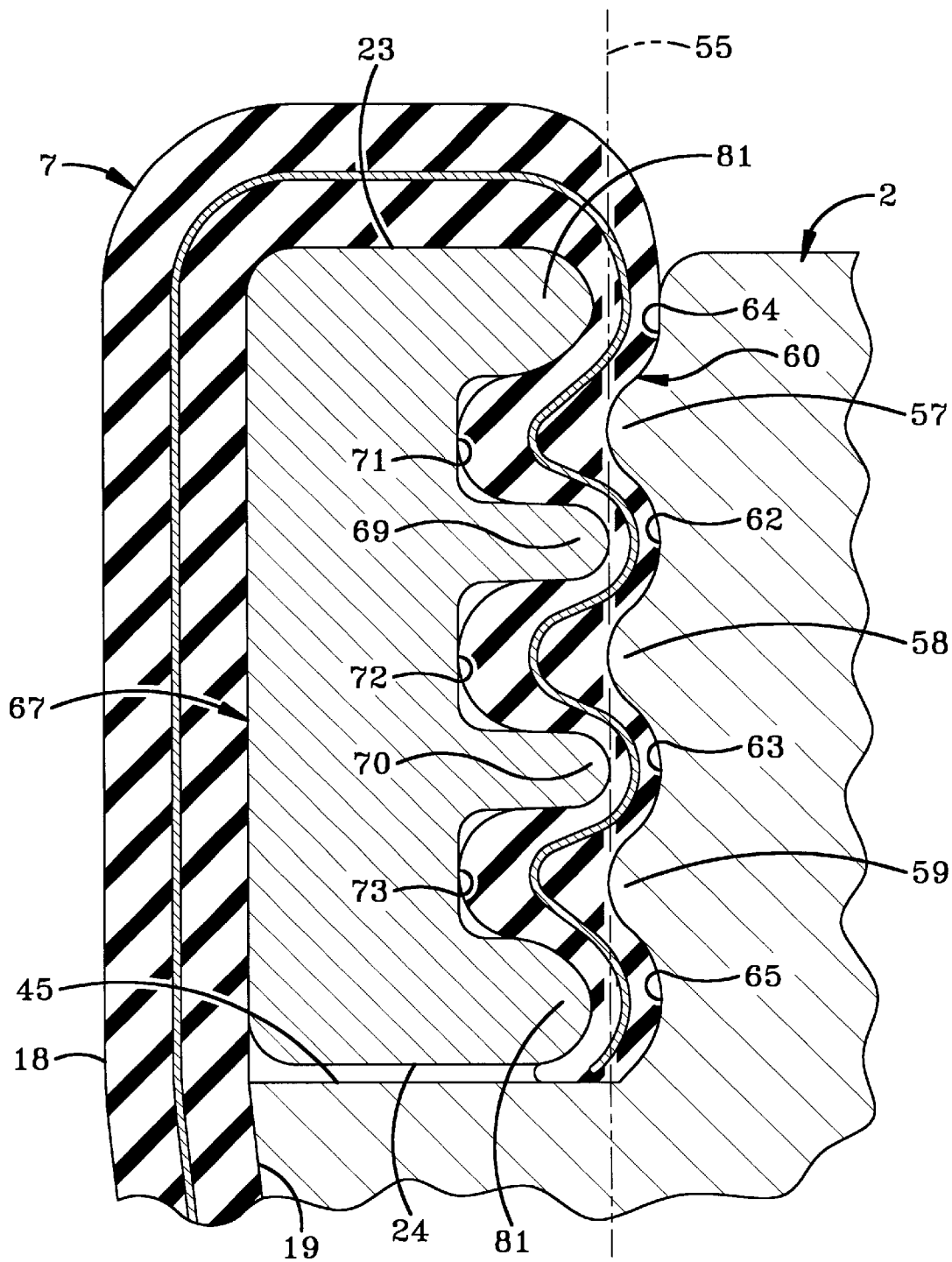
FIG. 7 is an enlarged fragmentary sectional view showing a modified clamping assembly.
Figure 8:
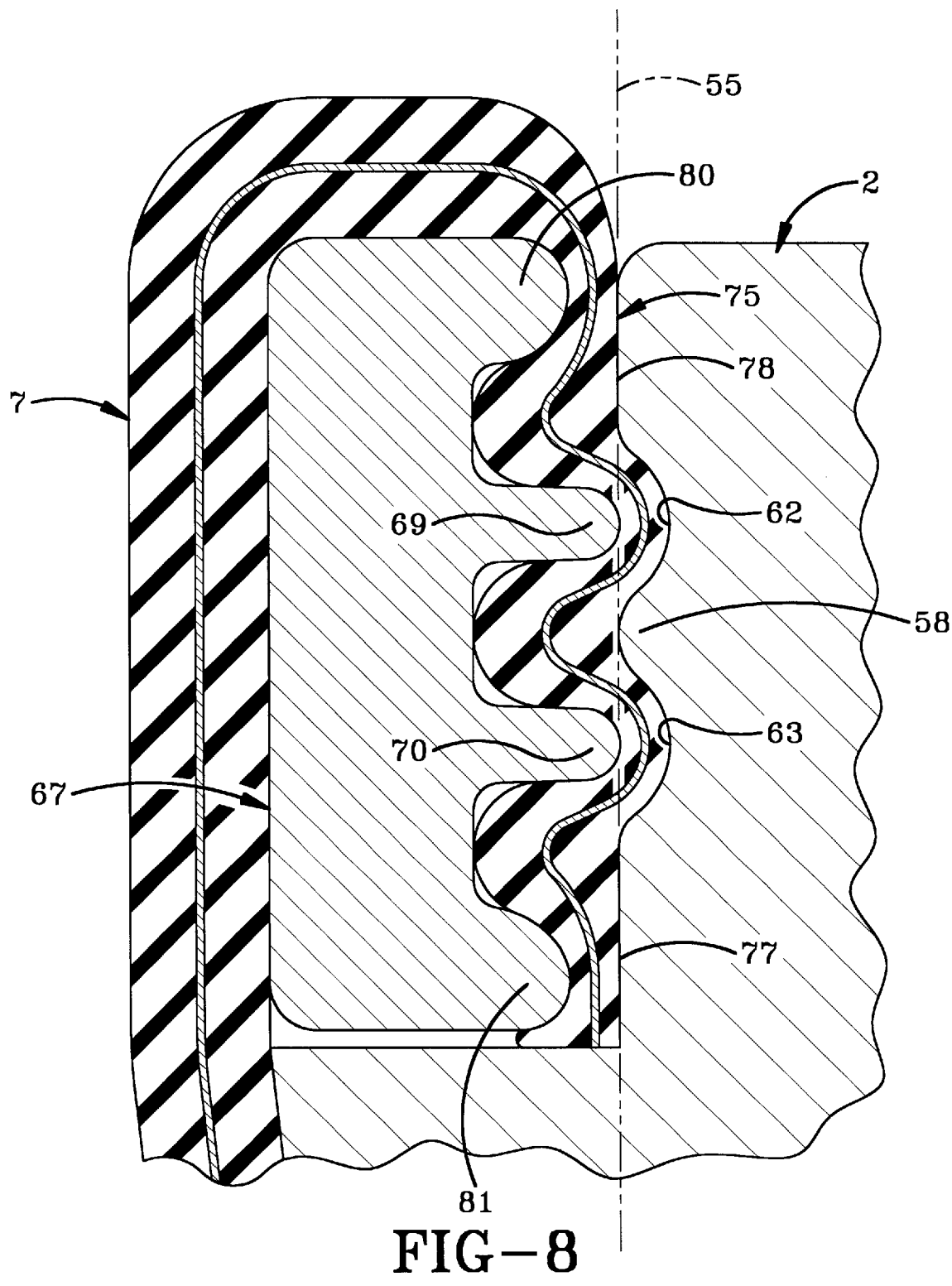
FIG. 8 is an enlarged fragmentary sectional view showing a further modified clamping assembly.

FIGS. 4, 7, and 8 show various embodiments of the invention, for clamping open end 12 of sleeve 7 on piston 2. However, the same construction and method of sealing is utilized for sealing open end 11 with end member 3. Likewise, swage rings 14 and 15 may be similar and therefor only swage ring 15 is shown in detail in FIGS. 2, 3, 5, and 6 and discussed below. Also, only one of the open ends of the flexible sleeve may be sealed with the improved clamping assembly of the present invention, although for most applications, both of the open ends will utilize a similar clamping assembly.

Figure 5:
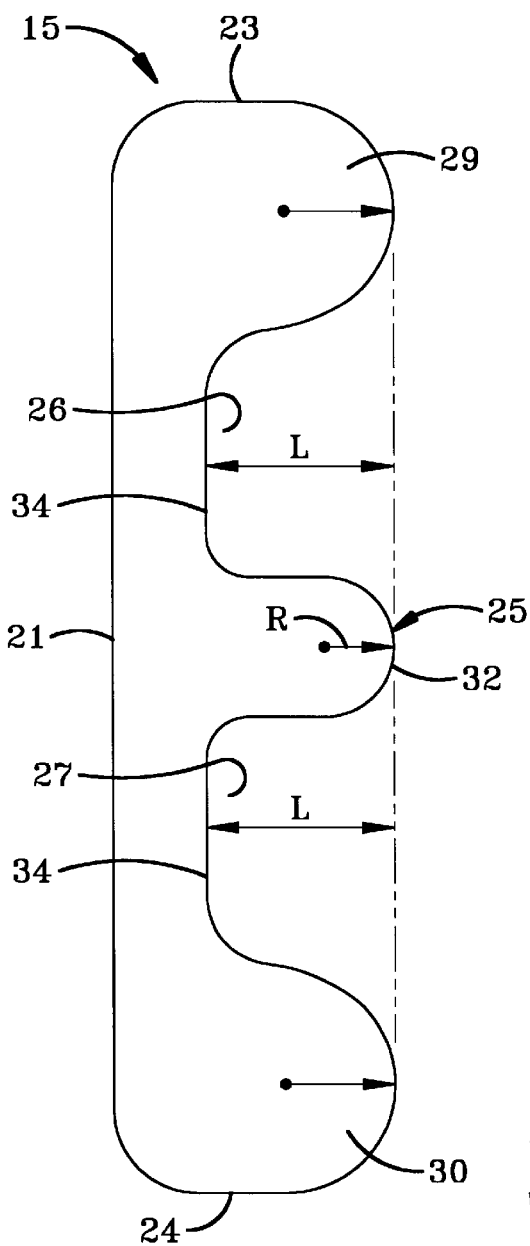
FIG. 5 is an enlarged sectional view of the swage ring.

A first embodiment of the improved clamping assembly is shown in FIGS. 2–6 and includes swage ring 15 which has a generally axially extending flat outer surface 21 and an inner axially extending clamping surface indicated generally at 22, which surfaces are connected by top and bottom annular relatively flat surfaces 23 and 24. In accordance with one of the features of the invention, inner clamping surface 22 includes a centrally located radially extending clamping rib 25, two radially extending generally concave recesses 26 and 27 found on either side of central clamping rib 25, and a pair of end clamping ribs 29 and 30 which are spaced equally and axially from central clamping rib 25 by recesses 26 and 27, respectively. As shown in FIG. 5, central clamping rib 25 has a generally smooth convexly curved outer surface 32 with a radius of curvature R and a radially extending length L. Radial length L is defined between a generally flat bottom surface 34 of recesses 26 and the apex of central clamping rib 25.

An axially extending clamping surface 37 is provided on piston 2 as shown particularly in FIGS. 4 and 6, and is radially aligned with clamping surface 22 of ring 15. Surface 37 is formed with three axially spaced concave recesses 38, 39, and 40, each of which have a generally smooth concavely curved bottom wall 41. Recesses 38, 39 and 40 have a depth $L_1$ which is defined between the radii of the recess and the apex of two radially extending clamping ribs 43 and 44. Clamping rib 43 separates recess 38 from recess 39 while clamping rib 44 separates recess 39 from recess 40. Clamping ribs 43 and 44 have generally smooth convex outer surfaces 47 and 48, respectively, which are formed with a radius of curvature defined by a radius $R_1$, and have a radial length defined by the depth $L_1$ of the adjacent concave recesses.

In accordance with another of the main features of the invention, the radial length L of clamping rib 25 of swage ring 15 is greater than the depth $L_1$ of the radially aligned recess 39 as shown in FIGS. 4–6. Likewise, the radius of curvature R of clamping rib 25 is less than the radius of curvature $R_2$ of the axially aligned recess 39. Likewise, radiuses $R_1$ of clamping ribs 43 and 44 of piston 2 are greater than that of radius R of rib 25 and will have a shorter radial length $L_1$. This relationship provides for the less aggressive clamping ribs and recesses of piston 2 to engage the inner surface or innerliner 18 of sleeve 7 with the more aggressive arrangement of clamping ribs and recesses in the clamping surface of swage ring 15 to engage outer surface 19 of sleeve 7. In the preferred embodiment, the radial length of clamping rib 25, designated at L, is approximately twice the radial length $L_1$ of the adjacent clamping ribs 43 and 44 of piston 2.

Likewise, as shown in FIG. 4, when in the final assembled clamped condition, three main pinch areas 50, 51, and 52 are formed between clamping ribs 29, 25, and 30 and recesses 38, 39, and 40, respectively. Again, the main feature is that the sharper or tighter radius of curvature and longer radial lengths of the ribs on the clamping surface of swage ring 15 is greater than the corresponding recesses and clamping ribs on clamping surface 37 of piston 2. This provides for the more aggressive clamping ribs to engage the outer surface of elastomeric sleeve 7 and the less aggressive sealing members to engage the more sensitive innerliner 18 to prevent puncture thereof.

Furthermore, it is preferred that the outer ends of the clamping ribs of the swage ring and of the piston generally terminate and lie on a common annulus or plane 55, as shown in FIG. 4. Also, a radially extending shoulder 45 is formed on piston 2 which abuts swage ring end 24 to limit the axial movement of the swage ring on the piston.

A modified clamping assembly is shown in FIG. 7. In this assembly, three clamping ribs 57, 58 and 59 are formed on the axially extending clamping surface 60 of piston 2 which form a pair of intermediate concave recesses 62 and 63 and two outer recesses 64 and 65. Swage ring 67 is formed with a pair of intermediate radially extending clamping ribs 69 and 70 which align with recesses 62 and 63, respectively, to provide a pair of pinch areas therebetween. Three recesses 71, 72, and 73 are formed in the inner clamping surface of swage ring 67 adjacent clamping ribs 69 and 70 and align with clamping ribs 57, 58, and 59, respectively, on clamping surface 60 of piston 2. Again, in accordance with the main feature of the invention and as clearly shown in FIG. 7, the radial length of swage ring ribs 69 and 70 is greater then the radial length of ribs 57, 58 and 59 of piston 2, and the depth of swage ring recesses 71–73 is greater than the depth of recesses 62–65 on sealing surface 60 of piston 2. Again, this arrangement provides for the more aggressive clamping surface to be on the swage ring, which engages outer surface 19 of sleeve 7, with the less aggressive clamping surface of piston 2 engaging the inner surface or innerliner 18 of sleeve 7. In the embodiment of FIG. 7, the radial lengths of clamping ribs 69 and 70 and depths of recesses 71–73 are approximately twice the radial lengths of ribs 57–59 and depths of recesses 62–65 of piston sealing surface 60. Also, as shown in FIG. 7, the outer curved ends of the clamping ribs of the swage ring and piston preferably align with an imaginary annular surface which is represented in cross section, by plane 55. Again, in the embodiment shown in FIG. 7, end surface 24 of swage ring 67 can abut radial shoulder 45 of piston 2 to limit the axial movement of swage ring 67 on piston 2.

Another clamping assembly embodiment is shown in FIG. 8 and is generally similar to the embodiment shown in FIG. 7, with the main difference being that the intermediate recesses 62 and 63 formed in sealing surface 75 of piston 2 terminate into generally annular axially extending surfaces 77 and 78 which, in cross section, are flat, as shown in FIG. 8. These surfaces align with two outermost axial spaced ribs 80 and 81 of swage ring 67. Again, the less aggressive clamping pattern is on piston 2 which engages innerliner 18 with the more aggressive clamping pattern of swage ring 67 engaging outer surface 19 of sleeve 7. The outer ends of intermediate projections 69 and 70 axially lie on a common annulus 55 with annular surfaces 77 and 78 of piston 2. Also, the radius of curvature of rib 58 is less aggressive, that is, it has a smoother and larger radius of curvature than the outer curved surfaces of intermediate clamping ribs 69 and 70 of swage ring 67.

Accordingly, the improved air spring, and in particular the clamping assembly therefor, has the more aggressive clamping surface engaged with the outer surface of the flexible sleeve with the less aggressive clamping surface being engaged with the innerliner of the sleeve. It is readily seen that for certain applications and arrangements, the more aggressive pattern could be formed on the piston clamping surface and/or the clamping surface of the end cap instead of on the swage ring so long as the more aggressive clamping surface engages the outer surface of the air spring sleeve and the less aggressive clamping surface engages the inner surface or innerliner of the sleeve. Again, the above description and drawings relate to the clamping surface of the piston and the corresponding swage ring. However, the same construction applies to the clamping surface of end member 3 and its swage ring 14.

Thus, the improved air spring and clamping assembly thereof provides an effective, safe, inexpensive, and efficient clamping assembly which achieves the numerated objectives, provides for eliminating difficulties encountered with prior clamping assemblies, and solves problems and obtains new results in the art, and in particular provides an improved clamping assembly for sealing the open ends of the flexible sleeve to the piston and/or end member of an air spring.

While the embodiments of the invention have been described, the invention is not limited thereto. The claims of the invention follow.

What is claimed is:

1. An air spring including:
    first and second end members adapted to be mounted at spaced locations;
    a flexible sleeve formed of an elastomeric material and having inner and outer surfaces and at least one open end sealingly engaged with the first end member and forming a fluid chamber therebetween;
    an annular axially extending sealing surface formed on the first end member, said sealing surface being engaged with the inner surface of the flexible sleeve and formed with at least two annular ribs extending radially outwardly and terminating in curved outer ends and at least one annular recess formed in said sealing surface and located between said ribs;
    an annular clamp ring located concentrically with respect to the annular sealing surface of said first end member and engageable with the outer surface of the flexible sleeve for sealingly clamping the open end of the flexible sleeve therebetween, said clamp ring having an axially extending inner clamping surface formed with at least a pair of recesses having bottom surfaces and an intervening annular rib, wherein the intervening annular rib of the clamp ring cooperates with the annular recess on the said first end member sealing surface to positionally locate said ring with respect to said first end member, and providing at least one pinch area for clamping the flexible sleeve therebetween; and
    said annular rib of the clamp ring having a greater radial length and sharper radius of curvature than the radial length and radius of curvature of the annular rib and recess of the said first end member sealing surface.

2. The air spring defined in claim 1 wherein the radial length of the annular rib of the clamp ring is generally twice the radial length of the annular rib of the first end member.

3. The air spring defined in claim 1 wherein the bottom surfaces of the recesses of the clamp ring are substantially flat.

4. The air spring defined in claim 1 wherein three annular recesses are formed in the sealing surface of the first end member.

5. The air spring defined in claim 4 wherein the three annular recesses are substantially similar to each other in radial depth and curvature.

6. The air spring defined in claim 4 wherein two additional annular ribs are formed on the sealing surface of the first end member spaced on axially opposite sides of said one rib; and in which the three ribs radially align with three annular recesses formed in the clamping surface of the clamp ring.

7. The air spring defined in claim 6 wherein the three annular ribs on the first end member are substantially similar to each other in radial length and radii of curvature.

8. The air spring defined in claim 1 wherein the first end member is a piston having a body formed with a radially extending annular shoulder terminating adjacent the sealing surface of said piston for abutting the clamp ring to restrict axial movement of said clamp ring during operation of the air spring.

9. The air spring defined in claim 1 wherein two annular ribs and three axially spaced recesses are formed in the clamp ring inner sealing surface.

10. The air spring defined in claim 1 wherein the first end member is an end cap.

11. The air spring defined in claim 1 wherein the curved outer ends of the two annular ribs of the first end member are convexly shaped.

12. An air spring including:
    first and second end members adapted to be mounted at spaced locations;
    a flexible sleeve formed of an elastomeric material and having inner and outer surfaces and at least one open end sealingly engaged with the first end member and forming a fluid chamber therebetween;
    an annular axially extending sealing surface formed on the first end member, said sealing surface being engaged with the inner surface of the flexible sleeve and formed with at least one annular rib extending radially outwardly and terminating in a curved outer end and at least two annular recesses formed in said sealing surface and located on opposite axial sides of said rib;
    an annular clamp ring located concentrically with respect to the annular sealing surface of said first end member and engageable with the outer surface of the flexible sleeve for sealingly clamping the open end of the flexible sleeve therebetween, said clamp ring having an axially extending inner clamping surface formed with at least two annular ribs and at least one intervening recess located between said annular ribs, wherein the annular ribs of the clamping ring cooperate with the annular recesses of the first end member sealing surface to positionally locate said ring with respect to said first end member, and providing a pair of pinch areas for clamping the flexible sleeve therebetween; and
    said annular ribs of the clamping ring having a greater radial length and sharper radius of curvature than the radial length and radius of curvature of the annular rib and recesses of the first end member sealing surface.

13. The air spring defined in claim 12 wherein the radial length of the annular ribs of the clamp ring is generally twice the radial length of the annular rib of the first end member.

14. The air spring defined in claim 12 wherein the recess of the clamp ring has a bottom surface which is substantially flat.

15. The air spring defined in claim 14 wherein the annular recesses of the first end member are substantially similar to each other in radial depth and curvature.

16. The air spring defined in claim 15 wherein the sealing surface of the first end member includes a pair of generally axially extending end surfaces located adjacent the two recesses; and in which the said two end surfaces lie in a common plane in cross section with the curved outer end of the annular rib on said first end member.

17. The air spring defined in claim 12 wherein the curved outer end of the first end member rib is convexly shaped.

* * * * *